Figure 5:
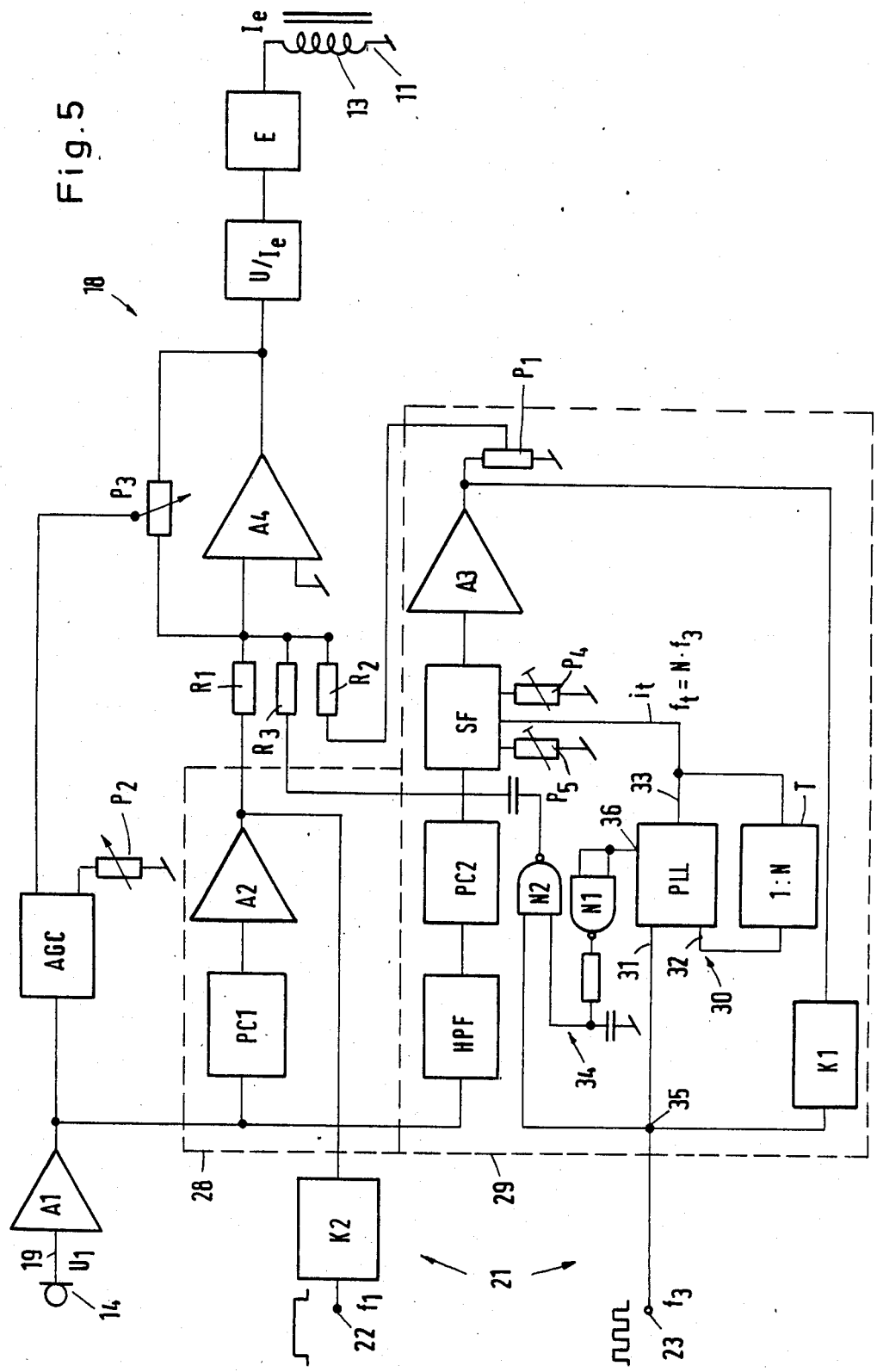

United States Patent [19]

Simonsen

[11] Patent Number: 4,669,320

[45] Date of Patent: Jun. 2, 1987

[54] APPARATUS FOR MEASURING A FORCE

[75] Inventor: Jens K. Simonsen, Nordborg, Denmark

[73] Assignee: Danfoss A/S, Nordborg, Denmark

[21] Appl. No.: 824,533

[22] Filed: Jan. 31, 1986

[30] Foreign Application Priority Data

Feb. 15, 1985 [DE] Fed. Rep. of Germany ....... 3505165

[51] Int. Cl.$^4$ ............................................... G01L 1/10
[52] U.S. Cl. .............................. 73/862.59; 73/DIG. 1
[58] Field of Search ........ 73/862.59, 862.41, 517 AV, 73/702, 704, 778, 581, DIG. 1

[56] References Cited

U.S. PATENT DOCUMENTS

| 3,479,536 | 11/1969 | Norris | 73/862.59 X |
| 3,529,470 | 9/1970 | Agar | 73/862.59 |
| 4,297,872 | 11/1981 | Ikeda et al. | 73/862.59 X |
| 4,535,638 | 8/1985 | Eernisse et al. | 73/862.59 |

Primary Examiner—Charles A. Ruehl
Attorney, Agent, or Firm—Wayne B. Easton

[57] ABSTRACT

The invention relates to an apparatus for measuring a force wherein the force to be measured is applied to a beam in an axial direction. Oscillating forces applied transversely to the beam sets the beam in its resonant state and the resulting resonant frequency is an indication of the magnitude of the force.

11 Claims, 5 Drawing Figures

Fig. 1
Fig. 4
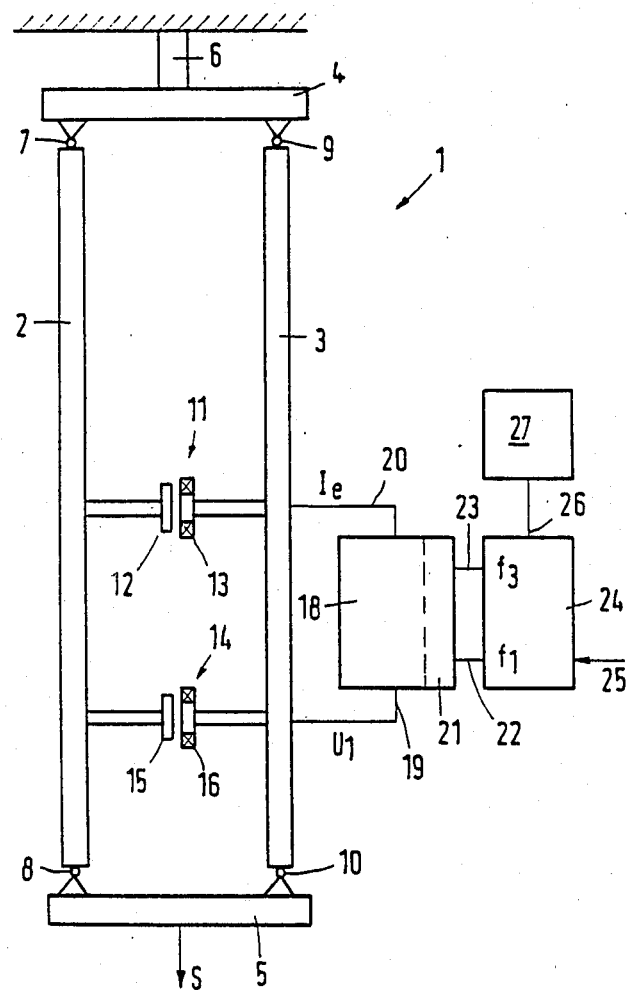
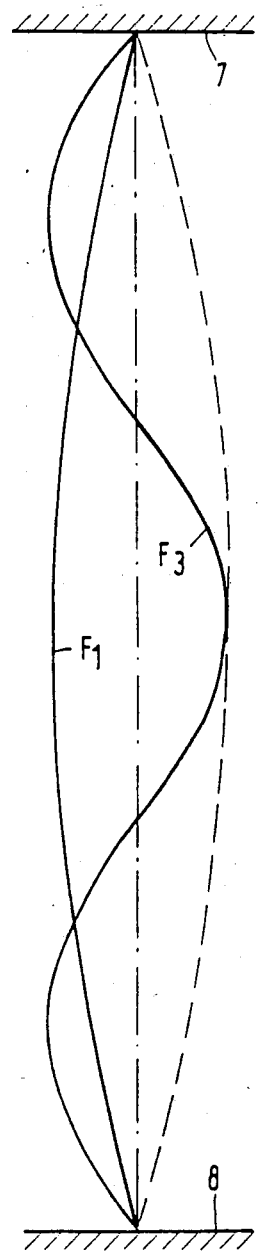
Fig. 2
Fig. 3
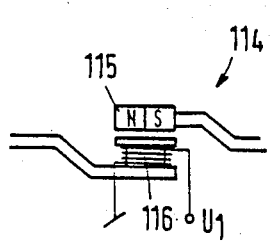
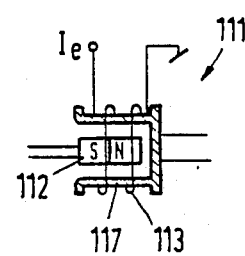

APPARATUS FOR MEASURING A FORCE

The invention relates to a method and apparatus for measuring a force.

It is the problem of the invention is to provide a novel possibility of force measurement giving very accurate results over a large range of values.

According to the invention, this problem is solved in that the force loads a beam in the axial direction, the beam is set into resonance oscillations, the existing frequency of the resonance oscillations is determined and the force is ascertained therefrom according to the formula $$S=(f^2-C_0)/C_1$$

wherein $C_0$ and $C_1$ are quantities depending on properties of the beam.

Since the resonance frequency clearly varies with the force, one can determine the force from the resonance frequency over a very large range of values.

In particular, the excitation frequency with which the beam is set into oscillation can be made to follow with the aid of the existing frequency of the resonance oscillation. This gives a low exciter power. Since the existing frequency of the resonance oscillation must in any event be determined to ascertain the force, one can use it without more expense also to regulate the exciter frequency.

With particular advantage, the beam is simultaneously excited into the resonance state by two frequencies which are substantially in the ratio of two whole numbers to each other, and values are derived from the resulting existing frequencies for the temperature-dependent correction of $C_0$ and $C_1$. In this way, the result of the measurement becomes independent of temperature. One here utilises the fact that the existing frequency of the second resonance oscillation has a different temperature dependence than the existing frequency of the first resonance oscillation, so that a temperature correction can be clearly derived from both frequencies.

Desirably, one of the two frequencies is the fundamental frequency. This gives the largest amplitude so that a marked measuring signal is obtained for the existing value of the resonance oscillation.

The other of the two frequencies should preferably correspond to the third harmonic. Since it is an odd-numbered harmonic, a common oscillator will suffice for the fundamental frequency and the harmonic. The third harmonic has the highest amplitude of all these harmonics.

With particular advantage, half the force is passed through each of two parallel beams and both beams are set into oscillation in opposite senses. This ensures that substantially no noise is transmitted to the surroundings.

Desirably, the force is applied to the beam as a tensile force. In this case, the upper limit of the measuring range is not limited by the bending force, in contrast with a compressive force, which can also be measured.

An apparatus for measuring a force to perform this method is characterised according to the invention in that a beam axially loadable with the force is secured against lateral deflection at two axially offset points to form respective nodes, that an oscillator engages the beam between the nodes, that the beam is associated with a sensor delivering a measuring signal to determine the existing frequency and that an exciter circuit is provided which makes the excitation frequency follow the resonance frequency with the aid of the existing frequency. Together with the exciter circuit, the beam forms oscillator means. The beam represents the resonance circuit and the exciter circuit gives the required loop amplification and feedback. Accordingly, a marked resonance oscillation is obtained with the least possible exciter power.

It is particularly favourable if the two beams are interconnected at their ends by way of common force-applying elements and relatively fixed at their nodes, the oscillator comprises two cooperating parts each applied to one beam, and the sensor likewise has two cooperating parts each applied to one beam. In this way, one avoids the radiation of oscillation energy to the surroundings and hence objectionable noise.

In a preferred embodiment, the oscillator produces a fundamental oscillation of the beam and a harmonic superimposed on the fundamental oscillation, there being a frequency determining circuit which determines from the measuring signal the values of the resonance frequencies of the fundamental oscillation and of the harmonic. Temperature-dependent correction can then be undertaken with the aid of the resonance frequencies of both oscillations.

Preferably, the oscillator is disposed substantially centrally between the nodes, and the sensor between the oscillator and the node. With the centrally disposed oscillator, one can simultaneously supply the oscillating energy for the fundamental oscillation and for an odd-numbered harmonic. The relatively offset sensor is adapted to receive a marked component of both oscillations.

When using the third harmonic as a harmonic oscillation, the sensor preferably has a spacing of 15 to 25%, preferably 20%, from the node. On the one hand, this enables the third harmonic to be derived near its highest amplitude and the fundamental oscillation likewise with an adequate amplitude.

With particular advantage, the exciter circuit comprises an input connected to the sensor, a fundamental frequency branch provided with an amplifier, a harmonic frequency branch provided with a selection filter arrangement and an amplifier, and a summation element in front of the output that receives the amplified signals from both branches. With the aid of the harmonic frequency branch one can separately process and amplify the harmonic so that it can be mixed with the amplified signal of the fundamental frequency branch in a predetermined and preferably adjustable ratio. This ensures that sufficient excitation energy is available for the harmonic.

It is favourable if the summation element is a summation amplifier with AGC regulation (automatic gain control). The exciter power is therefore regulated so that the measuring signals have a certain size permitting their evaluation.

In addition, both branches should each contain a phase-correcting element. Small correcting values will suffice for the fundamental oscillation. The harmonics may require considerable phase rotations, for example a phase reversal for the third harmonic.

It is also recommended that a voltage-current transformer be connected between the summation element and oscillator. In this way, one eliminates phase displacements caused by the inductance of the coils of the oscillator and measuring errors associated therewith.

With particular advantage, the selection filter arrangement comprises a band filter with a selection frequency predeterminable by timing pulses and a pulse generator is provided of which the frequency is made to follow the frequency of the harmonic in the harmonic branch. This ensures that, despite the changes in the harmonic occurring on a change in force, the selection filter arrangement will always tune its mean frequency accurately to the existing harmonic frequency. In the case of a solid filter, this avoids phase rotations occurring on a change in frequency.

In particular, the pulse generator can comprise a phase locking circuit of which the first input is connected by way of a comparator to a section of the haromonic branch following the amplifier and the second input by way of a 1:N divider to its output. This gives a particularly simple construction for the pulse generator which is dependent on the harmonic frequency.

Further, it is advisable to have a starter circuit in which the summation element has a further input which receives a square signal by way of a logic circuit when the first input of the phase locking circuit is energised and this circuit is not yet locked. This also enables excitation of the harmonic to be initiated so that phase locking occurs after a short time and the selection filter can operate normally.

It is also advantageous for a frequency determining circuit to be formed by utilising the exciter circuit and to comprise two frequency signal outputs each connected by way of a comparator to a section of the fundamental frequency branch or of the harmonic branch that follows the amplifier. Signals with the frequencies to be determined are readily obtained at the frequency signal outputs.

The invention will now be described in more detail with reference to the example shown in the drawing, wherein:

FIG. 1 is a diagrammatic representation of a force measuring apparatus with associated circuit;
FIG. 2 shows an embodiment of a sensor;
FIG. 3 shows an embodiment of an oscillator;
FIG. 4 shows the oscillating behaviour of a beam; and
FIG. 5 shows an example of an exciter circuit.

The apparatus 1 shown in FIG. 1 for measuring the tensile force S comprises two straight and parallel beams 2 and 3. They are articulated to two transverse connectors 4 and 5, one of which is held stationary by a carrier 6 and the other is loaded by the tensile force S. The illustrated joints therefore each form two nodes 7 and 8 as well as 9 and 10 for the two beams 2 and 3. Each beam can oscillate between these nodes at its fundamental or a harmonic frequency.

Substantially centrally of the beams 2 and 3 there is an oscillator 11 having a permanent magnet 12 connected to beam 2 and a drive coil 13 connected to beam 3. At a spacing of about 20% of the beam length from nodes 8 and 10, there is a sensor 14 comprising a permanent magnet 15 connected to beam 2 and an induction coil 16 connected to the other beam 3. If a periodic exciter current $I_e$ is fed to oscillator 11, the two beams 2 and 3 will oscillate in opposite senses. By reason of the oscillations, a measuring signal $U_1$ is induced in induction coil 16 of sensor 14 in the form of a voltage proportional to the speed of the beam movements relatively to each other.

A particularly effective example of a sensor 114 is shown in FIG. 2. Reference numerals are used which are 100 higher than in FIG. 1. A permanent magnet 115 magnetised transversely adjacent as south pole S and north pole N is opposite an induction coil 116 of which the axis is parallel to the beams.

A particularly effective example of an oscillator 111 is shown in FIG. 3. A permanent magnet 112 which is likewise magnetised next to each other transversely as south pole S and north pole N, is disposed within a drive coil 113 which consists of a carrier 117 of non-magnetisable material.

An exciter circuit 18 to be explained in more detail in conjunction with FIG. 5 receives the measuring signal $U_1$ at its input 19 and transmits the exciter current $I_e$ to the oscillator 11 by way of its output 20. The exciter circuit is such that the exciter current brings the beams into their condition of resonance in relation to their fundamental oscillation $F_1$ and their third harmonic $F_3$ as is diagrammatically shown in FIG. 4. The fundamental oscillation $F_1$ of each beam occurs between the full line $F_1$ and the broken line. The amplitude of the third harmonic $F_3$ is considerably less than shown and is superimposed on the fundamental oscillation.

A part of the exciter circuit 18 is utilised as a frequency determining circuit 21. The determined resonance frequencies $f_1$ and $f_3$ for the fundamental oscillation and the third harmonic are available at its outputs 22 and 23. The two frequencies are fed to an evaluating circuit 24 comprising a computer and a data store with an input 25. A signal for the size of the force S can be calculated from the programmed data and the frequencies $f_1$ and $f_3$ and delivered at the output 26, for example to a display device 27.

The harmonics are here designated with an ordinal which is referred to a fundamental oscillation with the ordinal 1. By reason of the temperature and the cross-section of the beams, the resonance frequencies of these oscillations are not necessarily in a whole number ratio to each other.

The construction of the exciter circuit will be evident from FIG. 5. Together with the beam arrangement, it forms oscillator means, of which the beams represent the resonance circuit and the exciter circuit gives the necessary loop amplification and feedback. As a result, the system is automatically set to the resonance frequencies of the beams. It is therefore possible to bring the beams simultaneously into oscillation with the resonance frequencies $f_1$ and $f_3$ of the fundamental oscillation and the harmonic. The measuring signal $U_1$ is fed by way of a pre-amplifier A1 to a fundamental oscillation branch 28 and a harmonic branch 29. The fundamental oscillation branch comprises a phase correcting circuit PC1 and an amplifier A2. Since the fundamental oscillation in the measuring signal $U_1$ is substantially in phase with the fundamental oscillation in the exciter current $I_e$, only a slight correction need take place in the phase correcting circuit PC1. The harmonics branch 29 comprises a high pass filter HPF, a phase correcting circuit PC2, a selection filter SF and an amplifier A3. In the measuring signal $U_1$, the third harmonic is of reverse phase to the third harmonic in the exciter current $I_e$. The phase correcting circuit PC2 therefore effects a phase reversal. The output signal of branch 28 is fed to a summation amplifier A4 by way of a summation resistor R1, the amplifier also having fed to it by way of a summation resistor R2 the output signal of branch 29 which is tapped at a potentiometer P1 to select the ratio of fundamental and harmonic oscillation in the output signal in such a way that a marked third harmonic is present in the beam. The measuring signal $U_1$ pre-amplified in the pre-amplifier A1 is also fed to an automatic amplifier regulator AGC which compares the amplitude of the amplified measuring signal with a desired value set on a potentiometer and, depending thereon, so regulates the amplification of the summation amplifier A4, that the measuring signal amplitude corresponds to the desired value, as is shown diagrammatically by a potentiometer P3 in the return circuit. The output of the summation amplifier A4 is fed by way of a voltage-current transformer $U/I_e$ and a terminal stage E to the oscillator 11 as a current $I_e$.

To enable the upper harmonic, i.e. here the third harmonic, to be filtered out cleanly, the high pass filter HPF, which blocks for lower frequencies, is supplemented by the selection filter SF of which the mean frequency governing the filtering function is determined by timing pulses $i_t$ which are produced by a pulse generator 30 and are supplied over a line 33 at a pulse frequency $f_t$ which is n times the harmonic frequency $f_3$. For this purpose, the one input 31 of a phase locking circuit PLL is connected by way of a comparator K1 to the output of the amplifier A3 of the harmonic branch 29 and the second input 32 is connected by way of a divider T to the output 33 of the phase locking circuit. The latter conventionally consists of the series circuit of a phase comparator, a low pass filter and a voltage-controlled oscillator. The pulse frequency $f_t$ is a whole number multiple of the harmonic frequency $f_3$. By way of example, N has the value 64. With the aid of the potentiometers P4 and P5, the selection filter SF can also be set. It is a so-called tracking filter, for example of type MF 10 by Messrs. National. Since the mean frequency of the selection filter SF is made to follow the resonance frequency $f_3$ of the harmonic, the filter is very accurately tuned to this frequency $f_3$, i.e. the harmonic is amplified while all other frequencies are strongly damped.

A starter circuit 34 comprises a logic circuit with two NAND elements N1 and N2. The NAND element N2 feeds the summation amplifier A4 by way of a third summation resistor R3 with randomly occurring square pulses whenever square pulses are available at the output 35 of comparator K1 and it is simultaneously indicated by the appearance of a signal 0 at a further output 36 of the phase locking circuit PLL that no phase locking has as yet occurred. But if the signal 1 occurs at output 36 on locking, i.e. during normal operation, the NAND element N2 remains blocked. The irregularly occurring square pulses produce an oscillation of different frequencies. By reason of the construction of the exciter circuit 18, the fundamental oscillation and third harmonic will soon predominate so that normal operational conditions are rapidly attained.

In such an exciter circuit 18, the frequency determining circuit 21 can have a very simple construction. It is merely necessary to connect the output 22 by way of a comparator K2 to the output of amplifier A2 in the fundamental oscillation branch 28 and to connect the output 23 to the output 35 of comparator K1 of the harmonics branch 29. Square pulses with the resonance frequency $f_1$ of the fundamental oscillation will then appear at output 22 and square pulses with the resonance frequency $f_3$ of third harmonic at output 23.

The frequency of the beam can be described as follows:

$$f_n = \frac{n^2 \cdot \pi}{2 \cdot l^2} \cdot \sqrt{\frac{E \cdot I}{\rho \cdot A}} \cdot \sqrt{1 + \frac{l^2}{n^2 \cdot E \cdot I \cdot \pi^2} \cdot S} \quad (1)$$

wherein
$f_n = n^{th}$ resonance frequency
n = ordinal of oscillation
l = length of beam
E = modulus of elasticity
I = moment of inertia
$\rho$ = beam density
A = cross-sectional area of beam
S = axial force.

After raising to the second power, this gives the frequencies of the fundamental oscillation and third harmonic:

$$f_1^2 = C_0 + C_1 \cdot S \quad (2)$$

$$f_3^2 = 81 \cdot C_0 + (1/9) C_1 \cdot S \quad (3)$$

and the combining expressions:

$$C_0 = \frac{\pi}{4} \cdot \frac{E \cdot I}{l^4 \cdot \rho \cdot A} = \frac{\pi}{4} \frac{E \cdot I}{l^3 \cdot M} \quad (4)$$

$$C_1 = \frac{1}{4 \cdot l^2 \cap A} = \frac{1}{4} \frac{1}{l \cdot M} \quad (5)$$

wherein
M = mass of beam.

The axial force can already be calculated from equation (2):

$$S = (f_1^2 - C_0)/C_1 \quad (6)$$

Since $C_o$ and $C_1$ are known under normal conditions, the force to be ascertained is derived directly from the resonance frequency $f_1$ of the fundamental oscillation.

To improve the measuring accuracy, one should, however, take account of ambient temperature because the quantities $C_o$ and $C_1$ contain values which depend on temperature, namely l, I, $\rho$, A and E. This dependence on temperature can be considered if the values $C_o$ and $C_1$ in both equations (2) and (3) are determined with the aid of the frequencies $f_1$ and $f_3$. By eliminating $C_1$, one thus obtains:

$$C_0 = -\frac{1}{728}(f_1^2 - 9 f_3^2) \quad (7)$$

The value $C_1$ likewise depends on temperature because the length l of the beam is included in it. However, since the length at normal temperature and the coefficient of expansion are known, one can calculate $C_1$ if ambient temperature is known. The ambient temperature can either be measured or determined from $C_o$ because $C_o$ only varies with temperature. However, one could also determine ambient temperature from frequencies $f_1$ and $f_2$ because these frequencies vary differently in dependence on temperature. The resonance frequency $f_1$ of the fundamental oscillation changes much more with a rise in temperature than does the resonance frequency $f_3$ of the harmonic. If, therefore, one interlinks the two frequencies in any calculation, be it in the value $C_o$ or in a quotient, one obtains a clear relationship between this interlinking value and temperature. Consequently, one can let $C_1$ be calculated by the computer of the evaluating circuit 24 when knowing $f_1$ and $f_3$.

The nodes could also be formed at a different position in that the beams 2 and 3 are interconnected near their ends by a respective strap. To determine the axial force, one can also use the resonance frequencies of oscillations other than the fundamental and third harmonic. In particular, one can use the second harmonic but this would require excitation other than at the centre and hence a higher excitation energy. At higher harmonics, one has to make do with smaller amplitudes of oscillation.

I claim:

1. Apparatus for measuring a static force, comprising, a pair of beams arranged in parallel, means connecting adjacent ends of said beams providing two nodes at opposite ends of said beams, means for receiving a static force at one end of said pair of beams for loading said beams in an axial direction, vibrator means having relatively moveable parts connected respectively to said beams for applying equal and opposite oscillating forces transversely to said beams, frequency sensor means connected to at least one of said beams for detecting the frequency thereof and generating a resultant output signal, exciter circuit means having an input connected to said frequency sensor means and an output connected to said vibrator means for generating a fundamental signal for exciting said beams at a resonant frequency f in response to the fundamental frequency sensed by said sensor means, said exciter circuit means having means for generating a harmonic signal and superimposing it on said fundamental signal for also exciting said beams at a harmonic frequency, means responsive to said fundamental and harmonic signals for determining the magnitude S of said static force in accordance with the equation $$S = (f_2 - C_0)/C_1$$

wherein $C_0$ and $C_1$ are temperature dependent correction factors having values which depend on the properties of said beams.

2. Apparatus according to claim 1 wherein said sensor means has two relatively moveable parts connected respectively to said beams.

3. Apparatus according to claim 2 wherein said exciter circuit means has a fundamental frequency branch provided with an amplifier and a harmonic frequency branch provided with a selection filter arrangement and an amplifier, said exciter circuit means output includes summation means that receives amplified signals from both of said branches.

4. Apparatus according to claim 3 characterized in that each of said branches has a phase correcting element.

5. Apparatus according to claim 3 wherein said output includes a current transformer connected to said summation means.

6. Apparatus according to claim 3 characterized in that said selection filter arrangement has a band filter with a selection frequency predeterminable by timing pulses, and a pulse generator for said selection filter arrangement having an output frequency which is forced to follow the frequency of said harmonic in said harmonic branch.

7. Apparatus according to claim 6 characterized in that said pulse generator comprises a phase locking circuit, a comparator following said amplifier of said harmonic frequency branch, said phase locking circuit having a first input connected to said comparator and a second input connected by way of a 1:N divider to its output.

8. Apparatus according to claim 7 including a starter circuit connected between said phase locking circuit and said summation means, said starter circuit having logic means for outputting a square signal to said summation means when said phase locking circuit is energized but has not yet locked.

9. Apparatus according to claim 3 wherein said exciter circuit has two outputs from said fundamental and harmonic frequency branches thereof, and a frequency determining circuit connected to said two outputs.

10. Apparatus according to claim 1 wherein said vibrator means is disposed substantially axially centered between said nodes, said sensor means being disposed axially between said vibrator means and one of said nodes.

11. Apparatus according to claim 10 wherein said sensor means is spaced on the order of 20 percent of the distance between said ends of said pairs of beams.

* * * * *

UNITED STATES PATENT AND TRADEMARK OFFICE
CERTIFICATE OF CORRECTION

PATENT NO. : 4,669,320
DATED : June 2, 1987
INVENTOR(S) : Jens K. Simonsen

It is certified that error appears in the above-identified patent and that said Letters Patent is hereby corrected as shown below:

Column 7, line 38, "$S=(f_2-C_0)/C_1$" should read -- $S=(f^2-C_0)/C_1$ --.

Signed and Sealed this

Twenty-eighth Day of February, 1989

Attest:

DONALD J. QUIGG

Attesting Officer   Commissioner of Patents and Trademarks